United States Patent
Henry et al.

(10) Patent No.: US 12,382,080 B2
(45) Date of Patent: Aug. 5, 2025

(54) METHOD FOR ENCODING AND DECODING A MULTI-VIEW VIDEO

(71) Applicant: ORANGE, Issy-les-Moulineaux (FR)

(72) Inventors: Félix Henry, Châtillon (FR); Patrick Garus, Châtillon (FR); Gordon Clare, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 49 days.

(21) Appl. No.: 18/246,749

(22) PCT Filed: Sep. 8, 2021

(86) PCT No.: PCT/FR2021/051540
§ 371 (c)(1),
(2) Date: Mar. 27, 2023

(87) PCT Pub. No.: WO2022/069809
PCT Pub. Date: Apr. 7, 2022

(65) Prior Publication Data
US 2023/0412831 A1 Dec. 21, 2023

(30) Foreign Application Priority Data
Sep. 29, 2020 (FR) ...................................... 2009913

(51) Int. Cl.
*H04N 19/463* (2014.01)
*H04N 19/119* (2014.01)
(Continued)

(52) U.S. Cl.
CPC ......... *H04N 19/463* (2014.11); *H04N 19/119* (2014.11); *H04N 19/136* (2014.11); *H04N 19/176* (2014.11)

(58) Field of Classification Search
CPC .. H04N 19/463; H04N 19/119; H04N 19/136; H04N 19/176; H04N 13/178;
(Continued)

(56) References Cited

U.S. PATENT DOCUMENTS 9,191,646 B2 * 11/2015 Rusanovskyy ...... H04N 13/161
9,363,535 B2 * 6/2016 Chen ..................... H04N 19/50
(Continued)

OTHER PUBLICATIONS

English translation of the Written Opinion of the International Searching Authority dated Dec. 10, 2021 for corresponding International Application No. PCT/FR2021/051540, filed Sep. 8, 2021.
(Continued)

*Primary Examiner* — Christopher S Kelley
*Assistant Examiner* — Ana Picon-Feliciano
(74) *Attorney, Agent, or Firm* — David D. Brush; Westman, Champlin & Koehler, P.A.

(57) ABSTRACT

A method for coding views simultaneously representing a 3D scene from different positions or different view angles, implemented by a coding device. The method includes, for a depth component of at least one view: partitioning the depth component into at least one block; obtaining depth information of the at least one block from texture data of a texture component of at least one of the views; obtaining at least one depth estimation parameter from the information; and coding the at least one depth estimation parameter, the depth information of the at least one block not being coded.

15 Claims, 5 Drawing Sheets

(51) Int. Cl.
    *H04N 19/136* (2014.01)
    *H04N 19/176* (2014.01)
(58) Field of Classification Search
    CPC .............. H04N 19/46; H04N 13/161; H04N 2013/0081; H04N 19/597
    USPC .................................................. 375/240.08
    See application file for complete search history.

(56) References Cited

U.S. PATENT DOCUMENTS

| | | | | |
|---|---|---|---|---|
| 9,565,449 | B2* | 2/2017 | Chen .................... | H04N 19/597 |
| 2011/0122225 | A1* | 5/2011 | Kim ...................... | H04N 19/597 |
| | | | | 348/42 |
| 2011/0211638 | A1 | 9/2011 | Sohn et al. | |
| 2013/0170552 | A1* | 7/2013 | Kim ....................... | H04N 19/36 |
| | | | | 375/E7.243 |
| 2014/0009574 | A1* | 1/2014 | Hannuksela ......... | H04N 19/147 |
| | | | | 348/42 |
| 2018/0376127 | A1 | 12/2018 | Schwarz et al. | |

OTHER PUBLICATIONS

Garus, Patrick et al., "Bypassing Depth Maps Transmission For Immersive Video Coding," PCS 2019—Picture Coding Symposium, HAL Open Science, Nov. 2019, Ningbo, China. pp. 1-5. HAL Id: hal-02397800.

Mieloch, Dawid et al., "Immersive video depth estimation," International Organisation for Standardisation Organisation Internationale De Normalisation, ISO/IEC JTC1/SC29/WG11, Coding of Moving Pictures and Audio, MPEG2020/m53407, Apr. 2020.

Stankiewicz, Olgierd, et al., "Enhanced Depth Estimation Reference Software (DERS) for Free-viewpoint Television," International Organisation for Standardisation Organisation Internationale De Normalisation, ISO/IEC JTC1/SC29/WG11, Coding of Moving Pictures and Audio, Research Gate, MPEG2013/M31518, Jan. 2013.

International Search Report dated Nov. 26, 2021, for corresponding International Application No. PCT/FR2021/051540, filed Sep. 8, 2021.

Written Opinion of the International Searching Authority dated Nov. 26, 2021, for corresponding International Application No. PCT/FR2021/051540, filed Sep. 8, 2021.

* cited by examiner

METHOD FOR ENCODING AND DECODING A MULTI-VIEW VIDEO

CROSS-REFERENCE TO RELATED APPLICATIONS

This Application is a Section 371 National Stage Application of International Application No. PCT/FR2021/051540, filed Sep. 8, 2021, the content of which is incorporated herein by reference in its entirety, and published as WO 2022/069809 on Apr. 7, 2022, not in English.

FIELD OF THE INVENTION

The present invention relates generally to the field of immersive videos, such as, in particular, multi-view videos. More particularly, the invention relates to the coding and decoding of multiple views which are captured to generate such immersive videos, and to the synthesizing of intermediate points of view that are not captured.

The invention can notably, but not exclusively, be applied to the video coding implemented in the current AVC and HEVC video coders, and the extensions thereof (MVC, 3D-AVC, MV-HEVC, 3D-HEVC, etc.), and to the corresponding video decoding.

PRIOR ART

To generate an omnidirectional video, such as, for example, a 360° video, it is routine practice to use a 360° camera. Such a 360° camera is composed of several 2D (two dimensions) cameras installed on a spherical platform. Each 2D camera captures a particular angle of a 3D (three dimensions) scene, seen from the same point of view, the set of views captured by the cameras making it possible to generate a video representing the 3D scene according to a 360°×180° field of view, from one point of view. It is also possible to use a single 360° camera to capture the 3D scene according to a 360°×180° field of view. Such a field of view can of course be less great, for example 270°×135°.

Such 360° videos then allow the user to watch the scene as if he or she were placed at the center thereof and look all around, to 360°, thus providing a new way of watching videos. Such videos are generally played back on virtual reality headsets, also known as HMD, for "head-mounted devices". But they can also be displayed on 2D screens equipped with suitable user interaction means. The number of 2D cameras to capture a 360° scene varies according to the platforms used.

However, the abovementioned 360° approach is limited since the viewer can watch the scene only from a single point of view.

In order to allow the viewer to change point of view, there are multi-view capture systems, in which the 3D scene is captured by a set of cameras of 2D type, each camera capturing a particular angle of the scene. In order to enhance the sense of immersion in the scene, one or more missing views, that is to say views representative of points of view not captured by the cameras, are synthesized from the existing views. The computing of these missing or intermediate views is performed by a so-called "view synthesis" algorithm. For example, the VSRS ("View Synthesis Reference") software can be used as view synthesis algorithm.

Conventionally, such a synthesis algorithm is based both on the texture components of the views captured at different instants by each camera, but also on depth components of these views, called "depth maps". A depth map represents the distance between each pixel of a view and the camera which has captured this view. Thus, each camera, from its respective point of view, captures a view of the 3D scene in the form of a texture component with which there is associated a depth map of the 3D scene, as seen from the respective point of view of the camera. There are several means for constructing a depth map: radar, laser, computational method using pixels of the current view and adjacent views.

There are known techniques for estimating depth from a set of texture components. Thus, the DERS method described in the document "O. Stankiewicz, K. Wegner, M. Tanimoto and M. Domański, *Enhanced Depth Estimation Reference Software (DERS) for Free-viewpoint Television*", ISO/IEC JTC1/SC29/WG11 Doc. MPEG M31518, Geneva, 2013" uses at least two texture components to initially estimate the disparity between two views, that is to say the displacement of one pixel between the two views, measured in number of pixels. To do this, for a block surrounding a current pixel in a current view, DERS successively applies "block-matching" steps, so as to identify, in another view, the block which minimizes the error with respect to the block of the current view. This search is performed horizontally since the views are considered as calibrated. The search is performed within a predetermined disparity interval, that is to say that the block matching will be done for all the blocks lying between a minimum disparity $D_{min}$ and a maximum disparity $D_{max}$. There is a direct link between disparity "d" and depth "Z" of the scene, the depth "Z" of a pixel of disparity "d" being equal to:

$$Z=(b*f)/d,$$

in which "b" is the distance between the optical centers of the cameras having taken the views, and "f" the focal length of the cameras. Thus, the minimum disparity $D_{min}$ corresponds to a maximum depth $Z_{max}$ expected in the scene, and the maximum disparity $D_{max}$ corresponds to a minimum depth $Z_{min}$ expected in the scene. In a concrete case, the capture of the scene is done by specifying a predetermined value of $Z_{min}$, for example 0.3 m, and of $Z_{max}$, for example 5 m. This directly produces the values $D_{min}$ and $D_{max}$ which will determine the number of disparity hypotheses to be evaluated. For example, in the case where it is determined that $D_{min}=2$ pixels and $D_{max}=192$ pixels, this means that the block-matching technique evaluates block-matching costs for all the disparity hypotheses D=2, 3, 4, . . . , 191, 192 pixels, i.e. 191 calculations to be stored and compared to one another. The DERS algorithm thus determines which disparity to choose from among the 191 possible, as a function of the cost associated with each disparity, and one or more regularizing parameters, including the parameter Sc (for "Smoothing Coefficient"). This coefficient determines the regularity of the depth map produced. Thus, if this coefficient is low, the depth map will be more accurate but risks including noise, whereas, if this coefficient is high, the depth map will be very regular, with uniform zones of depth, but risks poorly representing the small local variations. There are other depth estimation methods, such as, for example, the IVDE (for "Immersive Video Depth Estimation") method, presented in the document "Dawid Mieloch, Adrian Dziembowski, Jakub Stankowski, Olgierd Stankiewicz, Marek Domański, Gwangsoon Lee, Yun Young Jeong [*MPEG-I Visual*] *Immersive video depth estimation*, ISO/IEC JTC1/SC29/WG11 MPEG2020 m53407", which jointly determines the depth map of a series of views in parallel.

In a conventional immersive video coder, the texture components and their respective depth maps are coded and sent to a decoder which is installed, for example, in a display device of a user. On the decoder side, each view is decoded, the decoding of a view comprising the decoding of the texture component of that view, and the decoding of the depth map associated with the texture component of that view. A synthesis algorithm then constructs an intermediate view corresponding to a point of view requested by the user, from one or more decoded depth maps and from one or more decoded texture components.

The document "Patrick Garus, Jung Joel, Thomas Maugey, Christine Guillemot. *Bypassing Depth Maps Transmission For Immersive Video Coding. PCS* 2019—*Picture Coding Symposium, November* 2019*, Ningbo, China. pp.* 1-5. *hal*-02397800" describes an immersive video coder in which the depth maps are not coded. Only the texture components of the views are coded and transmitted to the decoder. On the decoder side, the texture components are decoded, then a depth estimation method, such as DERS for example, is applied to the decoded texture components to generate estimated depth maps. A VSRS (for "View Synthesis Reference Software") synthesis algorithm then uses these estimated depth maps to perform the view synthesis.

By virtue of this technique, the coding bit rate of an omnidirectional video is reduced since it is not necessary to code and transmit the depth maps. Furthermore, the number of pixels to be decoded to obtain a synthesized view is smaller than that used in a conventional immersive video decoder.

However, the decoding method used in this technique is intensive in terms of calculations since it requires the implementation of a depth estimation step in the decoder. Furthermore, since the depths estimated in the decoder are based on decoded texture components which are of lesser quality compared to the original texture components, the estimated depths are themselves of less good quality. The result thereof is that the view synthesis implemented in this technique is not therefore optimal, either in terms of image quality rendered to the user, or in terms of computational resource consumption.

SUMMARY OF THE INVENTION

One object of the present invention relates to a method for coding views simultaneously representing a 3D scene from different positions or different view angles, implemented by a coding device, comprising the following, for a depth component of at least one view:
partitioning said depth component into at least one block,
obtaining depth information of said at least one block from texture data of a texture component of at least one of said views,
obtaining at least one depth estimation parameter from the depth information,
coding said at least one depth estimation parameter, the depth information of said at least one block not being coded.

Such a coding method according to the invention makes it possible, when coding a view, to avoid coding the depth blocks of the component or depth map associated with this view, which lightens the calculations implemented by the coder, while saving on the memory resources which no longer have to store the coded data of the depth blocks. Because this depth block is not coded, no coded datum relating to this depth block is transmitted to a decoder, which reduces the cost of signaling of the information transmitted between the coder and the decoder. To compensate for the absence of coded data relating to the depth block and allow a decoding of the depth block, the coding method according to the invention implements the coding of at least one depth estimation parameter associated with the depth block, which depth estimation parameter will be used in the decoder to reconstruct the depth block without having to previously decode this depth block.

According to a particular embodiment, said at least one depth estimation parameter is either a depth value of said at least one block which is greater than each of the depth values of said at least one block, or a depth value of said at least one block which is less than each of the depth values of said at least one block.

According to this particular embodiment, the depth estimator of the decoder no longer needs, to reconstruct a depth block, to evaluate the likelihood of each possible corresponding depth for this block with each pixel of a reconstructed texture block of one or more views. In fact, according to this embodiment, the depth estimator simply, for a depth block to be reconstructed, estimates the depth of this block only within an interval lying between the minimum depth value and the maximum depth value of this block. Such a depth estimation considerably speeds up the depth estimation step which is a complex aspect of the state of the art.

According to another particular embodiment, said at least one depth estimation parameter is a parameter used by a depth estimation method.

According to this particular embodiment, said depth estimation parameter(s) used by the known depth estimation methods are advantageously optimized, so as to produce the estimated depth block that is the closest possible to the original depth block. Such parameters are for example regularizing parameters that make it possible to force the depth estimation algorithm to find a depth map with little noise or else reliability parameters allowing the depth estimation algorithm to continue to refine a depth value if its reliability is too low.

According to another particular embodiment, information representative of a depth estimation method is coded.

According to this particular embodiment, the coder is capable of testing different available depth estimation methods, each being likely to give more or less good results on a given content or block, of selecting the depth estimation method which produces the best depth estimation on the current block, and of coding this selection in order to transmit it to a decoder to apply the selected depth estimation to the current block. The various abovementioned embodiments or features can be added independently or in combination with one another to the coding method defined above.

The invention relates also to a device for coding views simultaneously representing a 3D scene from different positions or different view angles, said coding device comprising a processor which is configured to implement the following, for a depth component of at least one view:
partitioning the depth component into at least one block,
obtaining depth information of said at least one block from texture data of a texture component of at least one of said views,
obtaining at least one depth estimation parameter from the depth information,
coding said at least one depth estimation parameter, the depth information of said at least one block not being coded.

Such a coding device is notably able to implement the abovementioned coding method. The invention relates also to a method for decoding views simultaneously representing a 3D scene from different positions or different view angles, implemented by a decoding device, comprising the following, for a depth component of at least one view, the depth component being partitioned into at least one block:

reading, in a data signal, at least one depth estimation parameter associated with said at least one block, decoding said at least one depth estimation parameter, obtaining depth information of said at least one block from said at least one depth estimation parameter and from texture data of a reconstructed texture component of at least one of said views.

Such a decoding method according to the invention has low computational complexity and advantageously makes it possible to save on memory resources. Indeed, since the depth information of the block has not been coded, and therefore transmitted to the decoder, the latter does not need to decode it and store it. In the decoding, it is only worth decoding at least one depth estimation parameter transmitted in a data signal received by the decoder to reconstruct the depth information of the block, said at least one depth estimation parameter being less costly to transmit than the depth information.

According to a particular embodiment, said at least one depth estimation parameter is either a depth value of said at least one block which is greater than each of the depth values of said at least one block, or a depth value of said at least one block which is less than each of the depth values of said at least one block.

According to a particular embodiment, said at least one depth estimation parameter is a parameter used by a depth estimation method.

According to another particular embodiment, information representative of a depth estimation method is decoded.

The various abovementioned embodiments or features can be added independently or in combination with one another to the decoding method defined above.

The invention relates also to a device for decoding views simultaneously representing a 3D scene from different positions or different view angles, said decoding device comprising a processor which is configured to implement the following, for a depth component of at least one view, the depth component being partitioned into at least one block;

reading, in a data signal, at least one depth estimation parameter associated with said at least one block, decoding said at least one depth estimation parameter, obtaining depth information of said at least one block from said at least one depth estimation parameter and from texture data of a reconstructed texture component of at least one of said views.

Such a decoding device is notably able to implement the abovementioned decoding method.

The invention relates also to a view synthesis method, said synthesis method being implemented by a decoding or view synthesis device, comprising the following:

reconstructing a view in accordance with the decoding method according to the invention mentioned above, synthesizing at least a part of a view from the reconstructed view and from the information representative of the depth of said at least one block which has been obtained.

The invention relates also to a computer program comprising instructions for implementing the coding, decoding or synthesis method according to the invention, according to any one of the particular embodiments described previously, when said program is run by a processor.

Such instructions can be durably stored in a non-transient memory medium of the coding device implementing the abovementioned coding method, of the decoding device implementing the abovementioned decoding method or of the synthesis device implementing the abovementioned synthesis method.

This program can use any programming language, and be in the form of source code, object code, or intermediate code between source code and object code, as in a partially compiled form, or in any other desirable form.

The invention also targets a computer-readable storage medium or information medium, comprising instructions of a computer program as mentioned above.

The storage medium can be any entity or device capable of storing the program. For example, the medium can comprise a storage means, such as a ROM, for example a CD ROM or a microelectronic circuit ROM, or even a magnetic storage means, for example a USB key or a hard disk.

Also, the storage medium can be a transmissible medium such as an electrical or optical signal, which can be conveyed via an electrical or optical cable, wirelessly or by other means. The program according to the invention can in particular be downloaded over a network of Internet type.

Alternatively, the storage medium can be an integrated circuit in which the program is incorporated, the circuit being adapted to execute or be used in the execution of the abovementioned coding method, of the abovementioned decoding method or even of the abovementioned synthesis method.

BRIEF DESCRIPTION OF THE DRAWINGS

Other features and advantages will become apparent on reading particular embodiments of the invention, given as illustrative and nonlimiting examples, and the attached drawings, in which.

DETAILED DESCRIPTION OF AN EMBODIMENT OF THE INVENTION

Examples of Implementation of a Multi-View Video Coding Method

A method for coding multiview videos which can use any type of multiview video coders, for example conforming to the 3D-HEVC or MV-HEVC standard, or other standard, is described below.

Figure 1:
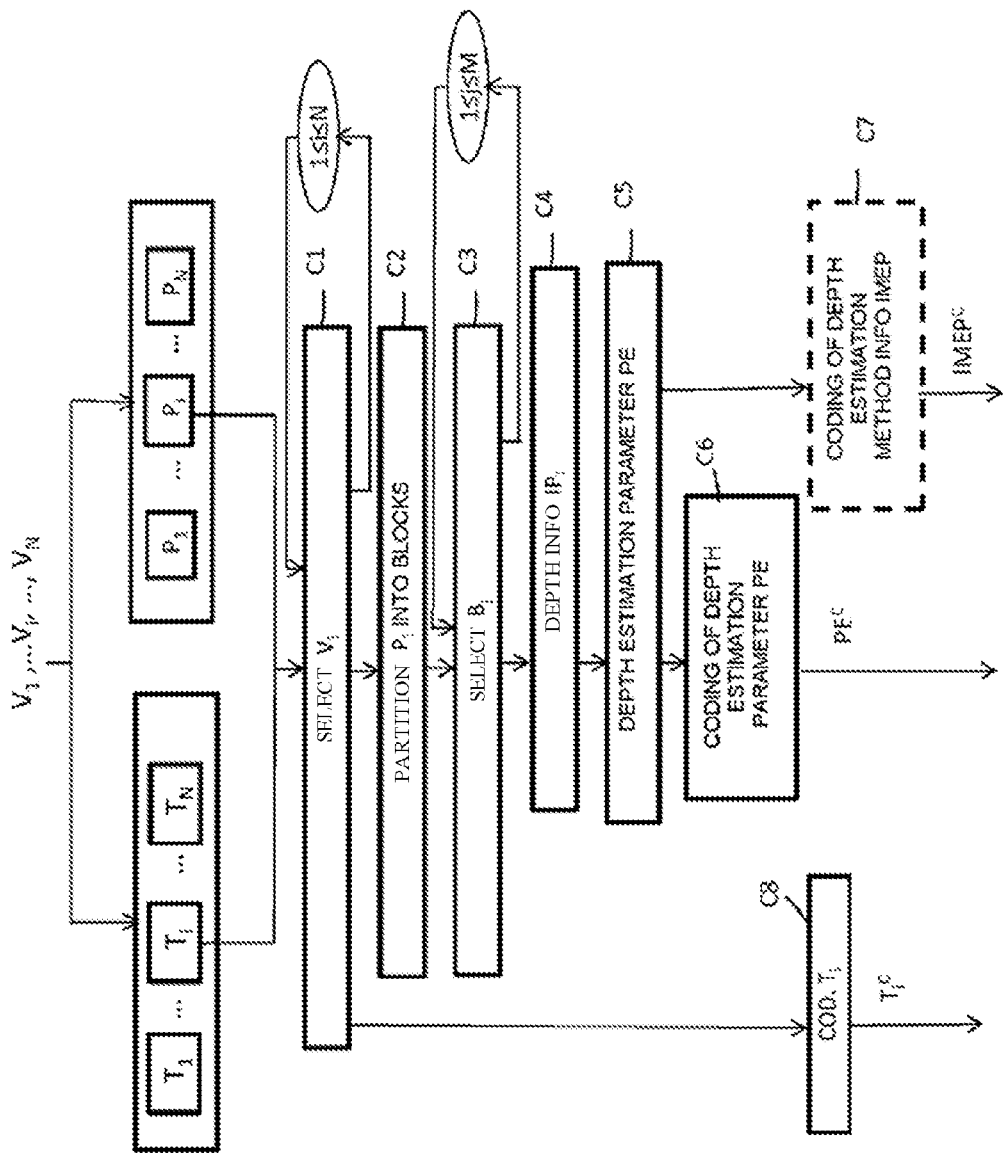
FIG. 1 represents the progress of a method for coding a view, in a particular embodiment of the invention.

Referring to FIG. 1, such a coding method is applied to a current view which forms part of a plurality of views $V_1, \ldots, V_N$, the plurality of views representing a 3D scene from, respectively, a plurality of view angles or a plurality of positions/orientations of the cameras capturing the scene.

The coding method according to the invention consists in coding, at a current instant:
a view $V_1$,
a view $V_2$,
. . . ,
a view $V_i$,
. . . ,
a view $V_N$.

One view considered out of N can equally be a texture component or a depth component or map associated with this view. For example, a current view $V_i$ ($1 \leq i \leq N$) is conventionally associated with a texture component $T_i$ of Q ($Q \geq 1$) pixels and with a depth component $P_i$ having Q depth values associated with Q pixels of at least one texture component, such as, for example, the texture component $T_i$ or with a texture component of a view other than the view $V_i$ out of N. As is known, the depth component $P_i$ can be generated directly from the texture image $T_i$ or else by capture of volumetric data of the 3D scene using devices such as, for example, LIDAR (for "light detection and ranging").

In C1, a current view $V_i$ is selected at the current instant, each of the N views being selected one after the other in a predetermined order.

In C2, the depth component $P_i$ of said at least one view $V_i$ is partitioned into a plurality of blocks $B_1, B_2, \ldots, B_j, \ldots, B_M$ ($1 \leq j \leq M$). In one possible embodiment, it is considered that a single depth block corresponds to a non-partitioned depth component $P_i$. The blocks of the depth component can be of predefined size (for example 64×64 pixels), parameterizable (and then the size used is transmitted in coded form), or else adaptive, with a signaling of the sizes used similar to that implemented in the HEVC standard. In the latter case, the depth component $P_i$ is first of all divided into blocks of maximum size (for example 64×64 pixels), then binary information is transmitted for each block indicating if the block must be subdivided into smaller blocks, recursively, until the predefined minimum block size (for example 4×4 pixels) is reached, for which no information is transmitted. This makes it possible to define the subdivision into blocks of the depth component $P_i$.

In C3, a current block $B_j$ of the depth component $P_i$ is selected, each of the blocks of the depth component $P_i$ being selected one after the other in a predetermined order.

In C4, for said at least one current block $B_j$, depth information $IP_j$ is obtained. As is known per se, for all or part of the pixels of a block of pixels BT of the texture component $T_i$ and/or of a texture component of a view other than the view $V_i$ out of N, depth values $Z_1$ to $Z_R$ corresponding to these pixels are obtained, forming a depth block $BP_j$ corresponding to the block of pixels BT.

In C5, at least one depth estimation parameter PE is obtained from said depth information $IP_j$.

Figure 2B:
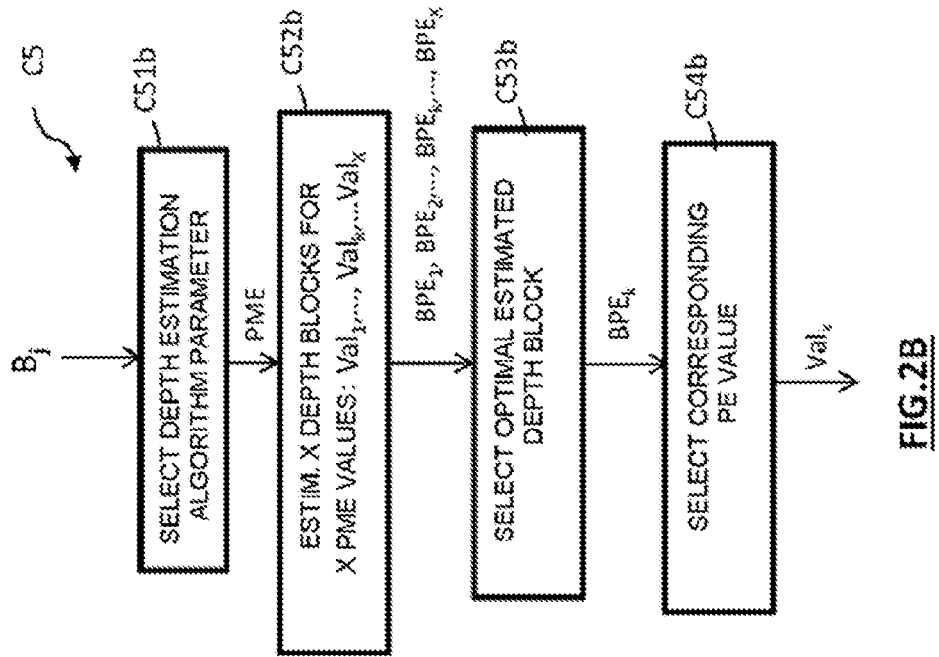
FIG. 2B represents a second embodiment of a step of obtaining a depth estimation parameter, implemented in the coding method of FIG. 1.
Figure 2A:
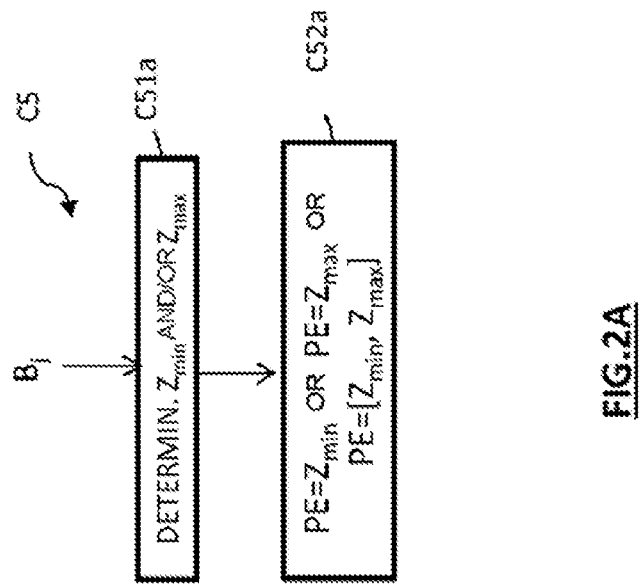
FIG. 2A represents a first embodiment of a step of obtaining a depth estimation parameter, implemented in the coding method of FIG. 1.

According to a first obtaining embodiment represented in FIG. 2A, in C51a, the maximum depth value $Z_{max}$ and/or the minimum depth value $Z_{min}$ out of the R depth values $Z_1$ to $Z_R$ are determined.

In C52a, $Z_{min}$, or $Z_{max}$, or the interval $[Z_{min}, Z_{max}]$ is assigned to the depth estimation parameter PE.

According to a second obtaining embodiment represented in FIG. 2B, in C51b, at least one depth estimation parameter PME of a depth estimation method is selected. This is for example a parameter of the depth estimation algorithm DERS mentioned above.

According to another example, it could be a parameter of another depth estimation algorithm, such as, for example, the IVDE algorithm. Regarding the DERS algorithm, the parameter selected is, for example, the regularizing parameter, or "smoothing coefficient", Sc which makes it possible to force the depth estimation algorithm DERS to find a depth block that is not noisy which corresponds to the block of pixels BT. Other examples of depth estimation algorithm parameter could be used, such as, for example:
a reliability parameter, such as the parameter $\lambda$ of the DERS algorithm which allows the DERS algorithm to continue to refine a depth value if its reliability is too low,
a smoothing parameter, such as, for example, the initial smoothing parameter $\beta_0$ used in the IVDE algorithm and described in the abovementioned document "Dawid Mieloch, Adrian Dziembowski, Jakub Stankowski, Olgierd Stankiewicz, Marek Domański, Gwangsoon Lee, Yun Young Jeong [*MPEG-I Visual*] *Immersive video depth estimation, ISO/IEC JTC1/SC29/WG11 MPEG2020 m53407*".

In C52b, for a finite set of X ($X \geq 1$) possible values $Val_1, \ldots, Val_k, \ldots, Val_X$ ($1 \leq k \leq X$) of the depth estimation parameter PME of a depth estimation method which has been selected, X estimated depth blocks $BPE_1, \ldots, BPE_k, \ldots, BPE_X$ are respectively obtained. For the parameter Sc, the finite set of possible values is, for example, {0.01, 0.02, 0.04, 0.08, 0.16}. Obviously, other values are possible according to the current video context. In C53b, out of the X blocks $BPE_1, \ldots, BPE_k, \ldots, BPE_X$ for which the depth has been estimated, the block for which the estimated depth is closest to the original depth block $BP_j$ obtained from the block of pixels BT is selected. Such a selection is implemented using a distortion measurement, such as, for example, PSNR (for "Peak Signal to Noise Ratio"), the mean square error, the sum of the absolute values of the differences or any other similar measurement. In the example represented, it is, for example, the estimated depth block $BPE_k$ which is selected.

In C54b, the value $Val_k$ of the depth estimation parameter PME of a depth estimation method which has been selected for the estimated depth block $BPE_k$ selected in C53b is then selected as value of the depth estimation parameter PE.

Referring once again to FIG. 1, in C6, the depth estimation parameter PE is coded, for example using a lossless coding method, such as, for example, CABAC (for "Context-adaptive binary arithmetic coding"), or even by Huffman coding, or by Lempel-Ziv coding. In the example of FIG. 2A, it is the values $Z_{min}$ or $Z_{max}$, or even the interval $[Z_{min}, Z_{max}]$, which are coded in C6. In the example of FIG. 2B, it is the value $Val_k$ of the regularization parameter Sc which is coded in C6 or even the abovementioned reliability or smoothing parameter, in other embodiments. In addition to this value $Val_k$, a value of another parameter can be coded, such as, for example, the abovementioned reliability or smoothing parameter, which was able to be obtained at the end of the step C54b. At the end of the step C6, a coded depth estimation parameter $PE^C$ is obtained.

Optionally, and for this reason represented by dotted lines in FIG. 1, information IMEP representative of the depth estimation method used in C5, for example DERS or IVDE, is coded in C7, for example using a lossless coding method, such as, for example, CABAC. Such IMEP information can be coded in the view $V_i$ or the sequence of views $V_i$ situated at different instants. At the end of the step C7, coded information $IMEP^C$ is obtained.

In C8, the texture component $T_i$ is coded using a conventional video coder, such as, for example, HEVC. At the end of the step C8, a coded texture component $T_i^C$ is obtained. According to a first embodiment represented in FIG. 3A, the coded depth estimation parameter $PE^C$, the coded information $IMEP^C$, and the data of the coded texture component $T_i^C$ are included in a same data signal F intended to be transmitted to a decoder which will be described later in the description.

Figure 3B:
FIG. 3B represents a second embodiment of signaling of the information coded by the coding method of FIG. 1.

According to a second embodiment represented in FIG. 3B, the coded depth estimation parameter $PE^C$ and the coded information $IMEP^C$ are included in a same data signal F, while the data of the coded texture component $T_i^C$ are included in another data signal F', the signals F and F' being intended to be transmitted to the abovementioned decoder.

Advantageously, in accordance with the invention, the coding method does not generate a coded depth block $BP_j^C$. Consequently, in the example of FIGS. 3A and 3B, the signal F does not contain any coded depth block $BP_j^C$.

The coding method which has just been described above can then be implemented for each block $B_1$ to $B_M$ of the depth component $P_i$ and then for each of the views $V_1$ to $V_N$.

Example of Implementation of Video Coding Device

Figure 4:
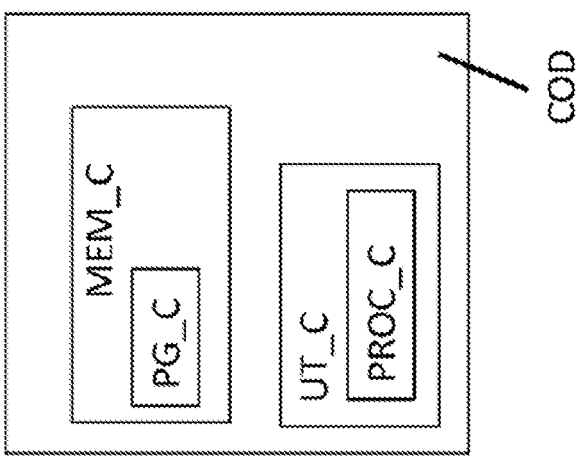
FIG. 4 represents a video coding device implementing the coding method of FIG. 1.

FIG. 4 presents the simplified structure of a coding device COD suitable for implementing the coding method according to any one of the particular embodiments of the invention.

According to a particular embodiment of the invention, the actions executed by the coding method are implemented by computer program instructions. For that, the coding device COD has the conventional architecture of a computer and notably comprises a memory MEM_C, a processing unit UT_C, equipped for example with a processor PROC_C, and driven by the computer program PG_C stored in memory MEM_C. The computer program PG_C comprises instructions for implementing the actions of the coding method as described above, when the program is run by the processor PROC_C.

On initialization, the code instructions of the computer program PG_C are for example loaded into a RAM memory (not represented) before being executed by the processor PROC_C. The processor PROC_C of the processing unit UT_C notably implements the actions of the coding method described above, according to the instructions of the computer program PG_C.

Examples of Implementation of a Multiview Video Decoding Method

A method for decoding multiview videos which can use any type of multiview video decoders, for example conforming to the 3D-HEVC or MV-HEVC standard, or other standard, is described hereinbelow.

Figure 5:
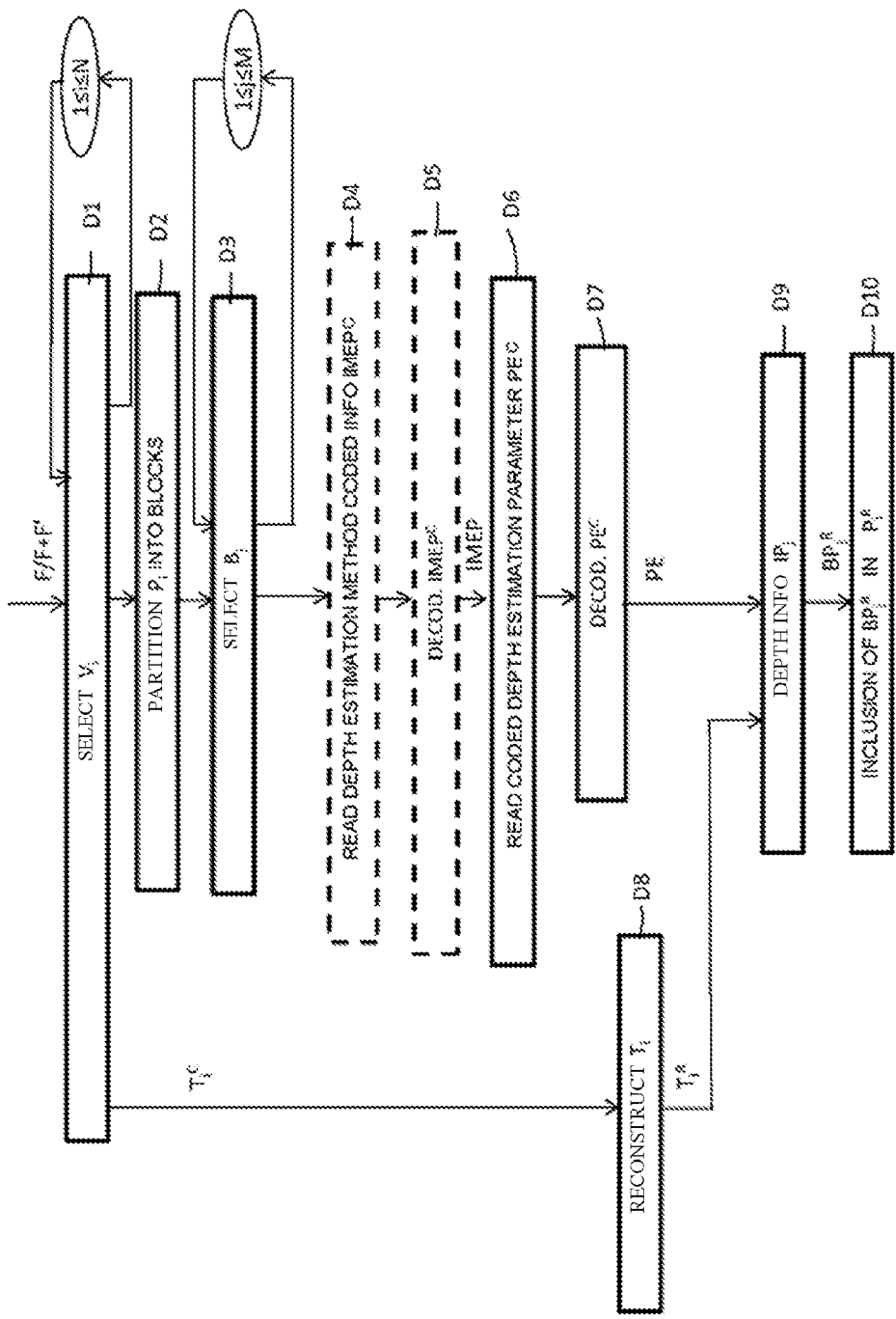
FIG. 5 represents the progress of a method for decoding a view, in a particular embodiment of the invention.

Referring to FIG. 5, such a decoding method is applied to a data signal representative of a current view which has been coded according to the abovementioned coding method, said current view forming part of a plurality of views $V_1, \ldots, V_N$.

The decoding method according to the invention consists in decoding:
  a data signal representative of the view $V_1$ which has been coded,
  a data signal representative of the view $V_2$ which has been coded,
  $\ldots,$
  a data signal representative of the view $V_i$ which has been coded,
  $\ldots,$
  a data signal representative of the view $V_N$ which has been coded.

The decoding method comprises the following, for a data signal F (FIG. 3A) or for the data signals F and F' (FIG. 3B) representative of a coded current view $V_i$ to be reconstructed:

In D1, a current view $V_i$ which has been coded is selected at the current instant, each of the N views being selected one after the other in a predetermined order.

In D2, the depth component $P_i$ to be reconstructed of said at least one view $V_i$ is partitioned into a plurality of blocks $B_1, B_2, \ldots, B_j, \ldots, B_M$ ($1 \leq j \leq M$). In one possible embodiment, it is considered that a single depth block corresponds to a non-partitioned depth component $P_i$. The depth blocks can be of predefined size (for example 64×64 pixels), parameterizable (and then the size used transmitted in coded form is decoded), or else adaptive, with a signaling of the sizes used similar to that implemented in the HEVC standard and read in the signal F. In the latter case, the depth component $P_i$ is first of all divided into blocks of maximum size (for example 64×64 pixels), then binary information is read for each block, for example in the signal F or another signal, indicating if the block must be subdivided into smaller blocks, recursively, until the predefined minimum block size is reached (for example 4×4 pixels), for which no information is read. This makes it possible to define the subdivision into blocks of the depth component $P_i$.

In D3, a current block $B_j$ of the depth component $P_i$ is selected, each of the blocks of the depth component $P_i$ being selected one after the other in a predetermined order.

Figure 3A:
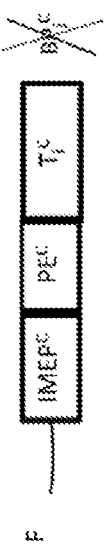
FIG. 3A represents a first embodiment of signaling of the information coded by the coding method of FIG. 1.

In D4, optionally, and for this reason represented by dotted lines in FIG. 5, the coded information $IMEP^C$ representative of the depth estimation method which was used in C5 (FIG. 1) is read in the data signal F (FIG. 3A or 3B).

In D5, the coded information $IMEP^C$ is decoded, for example using a lossless decoding method, such as, for example, CABAC, or even by Huffman decoding or by Lempel-Ziv decoding. Such coded information $IMEP^C$ can be decoded in the current view $V_i$ or in the sequence of views $V_i$ situated at different instants. At the end of the step D5, information IMEP is obtained.

Alternatively to the optional steps D4 and D5, the depth estimation method which was used in C5 could be predefined in the decoder. In this case, the IMEP information representative of the depth estimation method is directly available.

In D6, at least one coded depth estimation parameter $PE^C$ associated with the current block $B_j$ to be reconstructed of the depth component $P_i$ is read in the data signal F of FIG. 3A or FIG. 3B.

In D7, said at least one coded depth estimation parameter $PE^C$ is decoded, for example using a lossless decoding method, such as, for example, CABAC, or else by Huffman decoding or by Lempel-Ziv decoding. If it was the depth values $Z_{min}$ or $Z_{max}$, or else the interval $[Z_{min}, Z_{max}]$ which were coded in C6:

either the depth value $Z_{min}$ is decoded in D7 and is assigned to the depth estimation parameter PE, or the depth value $Z_{max}$ is decoded in D7 and is assigned to the depth estimation parameter PE, or the interval of depth values $[Z_{min}, Z_{max}]$ is decoded in D7 and is assigned to the depth estimation parameter PE.

If it is the value $Val_k$ of the regularization parameter Sc which was coded in C6, and/or even of the abovementioned reliability or smoothing parameter according to other embodiments, it is the value $Val_k$ which is decoded in D7 and which is assigned to the depth estimation parameter PE. In addition to this value $Val_k$, a value of another parameter, such as, for example, the abovementioned reliability or smoothing parameter, which was obtained at the end of the step C54b, can be decoded.

In D8, the texture component $T_i$ of said at least one view $V_i$ is reconstructed, for example by means of a conventional video decoder, such as, for example, HEVC. A reconstructed texture component $T_i^R$ is obtained at the end of the step D8. Obviously, the step D8 can be implemented before the steps D1 to D7 or at any instant, on reception of the data signal F (FIG. 3A) or F' (FIG. 3B). To this end, the data of the coded texture component $T_i^C$ are read in the signal F (FIG. 3A) or F' (FIG. 3B), then reconstructed, generating the reconstructed texture component $T_i^R$.

In D9, depth information $IP_j$ of said current block $B_j$ is obtained from said at least one depth estimation parameter PE which was decoded in D7 and from texture data (pixels) of said reconstructed texture component $T_i^R$ or of a reconstructed texture component of a view other than the view $V_i$ out of N.

According to a first embodiment of the step D9, by using the predefined depth estimation method or that corresponding to the IMEP parameter obtained in D5, a depth search is implemented for each pixel of a block of the reconstructed texture component $T_i^R$ using the depth value $Z_{min}$, or the depth value $Z_{max}$ or even the interval of depth values $[Z_{min}, Z_{max}]$ relating to the current block $B_j$ of the depth component $P_i$ to be reconstructed. The advantage of such an operation is in determining the depth of the current block $B_j$, not between the theoretically possible maximum depth and minimum depth (generally, between 0 meter and infinity), but between at most $[Z_{min}, Z_{max}]$. This makes it possible to greatly reduce the number of depths to be tested and thus reduce the complexity of the depth estimation algorithm. At the end of the first embodiment of step D9, a reconstructed depth block $BP_j^R$ corresponding to the current block $B_j$ is obtained. According to a second embodiment of the step D9, the predefined depth estimation method or that corresponding to the IMEP parameter obtained in D5 is applied to the current block $B_j$ by using the value $Val_k$ of the regularization parameter Sc (or of the reliability or smoothing parameter for example) which was decoded in D7 to conduct the depth search for each pixel of a block of the reconstructed texture component $T_i^R$. At the end of the second embodiment of the step D9, a reconstructed depth block $BP_j^R$ corresponding to the current block $B_j$ is obtained. By virtue of this second embodiment, the reconstructed depth block $BP_j^R$ is as close to the depth block $BP_j$ which was obtained in C4 during the coding method of FIG. 1, the depth block $BP_j$, advantageously according to the invention, having been neither coded nor transmitted in the signal F or F'.

In D10, the reconstructed depth block $BP_j^R$ is then included in a depth component currently being reconstructed $P_i^R$ corresponding to the reconstructed texture component $T_i^R$.

The decoding method which has just been described above is then implemented for each block of pixels $B_1$ to $B_M$ to be reconstructed and then for each of the views $V_1$ to $V_N$ to be reconstructed.

Example of Implementation of Video Decoding Device

Figure 6:
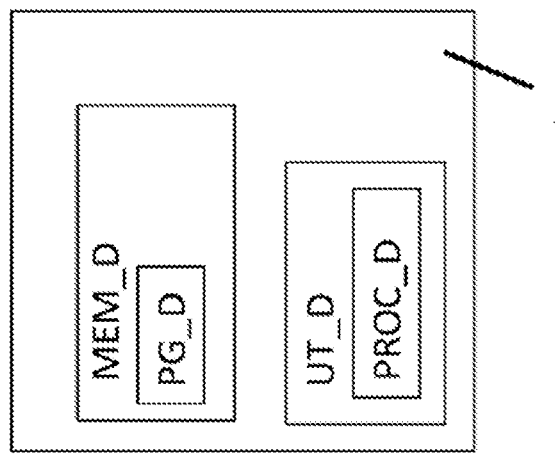
FIG. 6 represents a video decoding device implementing the decoding method of FIG. 5.

FIG. 6 presents the simplified structure of a decoding device DEC suitable for implementing the decoding method according to any one of the particular embodiments of the invention.

According to a particular embodiment of the invention, the actions executed by the abovementioned decoding method are implemented by computer program instructions. For that, the decoding device DEC has the conventional architecture of a computer and notably comprises a memory MEM_D, a processing unit UT_D, equipped for example with a processor PROC_D, and driven by the computer program PG_D stored in memory MEM_D. The computer program PG_D comprises instructions for implementing the actions of the decoding method as described above, when the program is run by the processor PROC_D.

On initialization, the code instructions of the computer program PG_D are for example loaded into a RAM memory (not represented) before being executed by the processor PROC_D. The processor PROC_D of the processing unit UT_D notably implements the actions of the decoding method described above, according to the instructions of the computer program PG_D.

Examples of Implementation of a View Synthesis Method

A view synthesis method which uses a view reconstructed according to the decoding method of FIG. 5 is now described with reference to FIG. 7.

Figure 7:
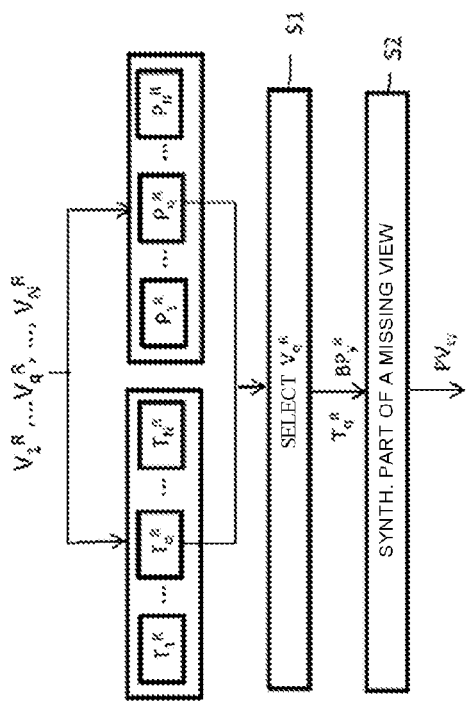
FIG. 7 represents the progress of a missing view synthesis method, in a particular embodiment of the invention.

As illustrated in FIG. 7, the synthesis method according to the invention uses at least one reconstructed view out of N reconstructed views $V_1^R, \ldots, V_N^R$ obtained at the end of the decoding method of FIG. 5.

In S1, at least one reconstructed view $V_q^R$ ($1 \leq q \leq N$) is selected out of the N reconstructed views. A reconstructed view $V_q^R$ comprises a reconstructed texture component $T_q^R$ and its associated reconstructed depth component $P_q^R$.

In S2, at least one synthesized part $PV_{sy}$ of a missing or intermediate view, such as a view requested by a user to be displayed on the screen of his or her computer or of his or her telephone for example, is calculated from the reconstructed texture component $T_q^R$ and from at least one reconstructed depth block $BP_y^R$ associated with a reconstructed block of pixels $B_y^R$ of this reconstructed texture component $T_q^R$, with $1 \leq y \leq M$. The synthesized part $PV_{sy}$ of the missing or intermediate view is calculated using a conventional synthesis algorithm, such as, for example, the VSRS algorithm, the RVS ("Reference View Synthesizer") algorithm, the VVS ("Versatile View Synthesizer") algorithm, etc.

Examples of Implementation of a Synthesis Device

Figure 8A:
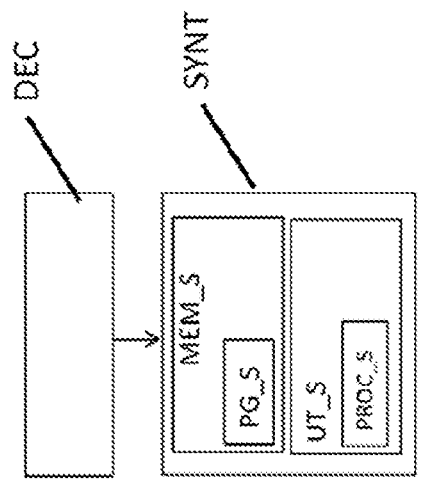
FIG. 8A represents a synthesis device implementing the synthesis method of FIG. 7, in a particular embodiment of the invention.
Figure 8B:
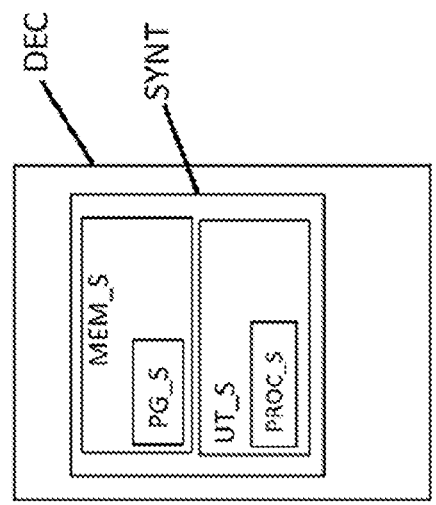
FIG. 8B represents a synthesis device implementing the synthesis method of FIG. 7, in another particular embodiment of the invention.

FIG. 8A or 8B presents the simplified structure of a synthesis device SYNT suitable for implementing the synthesis method of FIG. 7 according to any one of the particular embodiments of the invention.

According to a particular embodiment of the invention, the actions executed by the synthesis method of FIG. 7 are implemented by computer program instructions. For that, the synthesis device SYNT has the conventional architecture of a computer and notably comprises a memory MEM_S, a processing unit UT_S, equipped for example with a processor PROC_S, and driven by the computer program PG_S stored in memory MEMS. The computer program PG_S comprises instructions for implementing the actions of the synthesis method as described above, when the program is run by the processor PROC_S.

On initialization, the code instructions of the computer program PG_S are, for example, loaded into a RAM memory (not represented) before being executed by the processor PROC_S. The processor PROC_S of the processing unit UT_S notably implements the actions of the synthesis method described above, according to the instructions of the computer program PG_S.

According to the embodiment represented in FIG. 8A, the synthesis device SYNT is arranged at the output of the decoder DEC, as illustrated in FIG. 8A.

According to the embodiment represented in FIG. 8B, the synthesis device SYNT forms an integral part of the decoder DEC, as illustrated in FIG. 8B.

The invention claimed is:

1. A method for coding views simultaneously representing a 3D scene from different positions or different view angles, implemented by a coding device, comprising the following, for a depth component of at least one view:
   partitioning said depth component into at least one block,
   obtaining depth information of said at least one block of the depth component, from texture data of a texture component of at least one of said views,
   obtaining at least one depth estimation parameter from said depth information of said at least one block of the depth component, and
   coding said at least one depth estimation parameter, the depth information of said at least one block not being coded.

2. The coding method as claimed in claim 1, wherein said at least one depth estimation parameter is either a depth value of said at least one block which is greater than each of the depth values of said at least one block, or a depth value of said at least one block which is less than each of the depth values of said at least one block.

3. The coding method as claimed in claim 1, wherein said at least one depth estimation parameter is a parameter used by a depth estimation method.

4. The coding method as claimed in claim 1, wherein information representative of a depth estimation method is coded.

5. A device for coding views simultaneously representing a 3D scene according to different positions or different view angles, said coding device comprising:
   a processor which is configured to implement the following, for a depth component of at least one view:
   partitioning said depth component into at least one block,
   obtaining depth information of said at least one block of the depth component, from texture data of a texture component of at least one of said views,
   obtaining at least one depth estimation parameter from said depth information of said at least one block of the depth component, and
   coding said at least one depth estimation parameter, the depth information of said at least one block not being coded.

6. A non-transitory computer-readable information medium, comprising instructions of a computer program stored thereon which when executed by a processor of a coding device cause the coding device to implement a method for coding views simultaneously representing a 3D scene from different positions or different view angles, the method comprising the following, for a depth component of at least one view:
   partitioning said depth component into at least one block,
   obtaining depth information of said at least one block of the depth component, from texture data of a texture component of at least one of said views,
   obtaining at least one depth estimation parameter from said depth information of said at least one block of the depth component, and
   coding said at least one depth estimation parameter, the depth information of said at least one block not being coded.

7. A method comprising:
   decoding views simultaneously representing a 3D scene from different positions or different view angles, implemented by a decoding device, the decoding comprising the following, for a depth component of at least one view, said depth component being partitioned into at least one block:
   reading, in a data signal, at least one depth estimation parameter associated with said at least one block of the depth component,
   decoding said at least one depth estimation parameter, and
   obtaining depth information of said at least one block of the depth component, from said at least one depth estimation parameter and from texture data of a reconstructed texture component of at least one of said views.

8. The method as claimed in claim 7, wherein said at least one depth estimation parameter is either a depth value of said at least one block which is greater than each of the depth values of said at least one block, or a depth value of said at least one block which is less than each of the depth values of said at least one block.

9. The method as claimed in claim 7, wherein said at least one depth estimation parameter is a parameter used by a depth estimation method.

10. The method as claimed in claim 7, wherein information representative of a depth estimation method is decoded.

11. A device for decoding views simultaneously representing a 3D scene from different positions or different view angles, said decoding device comprising:
   a processor which is configured to implement the following, for a depth component of at least one view, said depth component being partitioned into at least one block:
   reading, in a data signal, at least one depth estimation parameter associated with said at least one block of the depth component,
   decoding said at least one depth estimation parameter, and
   obtaining depth information of said at least one block of the depth component, from said at least one depth estimation parameter and from texture data of a reconstructed texture component of at least one of said views.

12. The method as claimed in claim 7, comprising:
   reconstructing a view in accordance with the decoding, and synthesizing at least a part of a view from the reconstructed view and from the information representative of the depth of said at least one block which has been obtained.

13. A non-transitory computer-readable information medium, comprising instructions of a computer program stored thereon which when executed by a processor of a decoding device cause the decoding device to implement a method for decoding views simultaneously representing a 3D scene from different positions or different view angles, the decoding comprising the following, for a depth component of at least one view, said depth component being partitioned into at least one block:

reading, in a data signal, at least one depth estimation parameter associated with said at least one block of said depth component, decoding said at least one depth estimation parameter, and obtaining depth information of said at least one block of said depth component, from said at least one depth estimation parameter and from texture data of a reconstructed texture component of at least one of said views.

14. The coding method as claimed in claim 3, wherein a value of said parameter used by the depth estimation method is selected among several candidate values, such that for the selected value, a depth information obtained by said depth estimation method is closest to the depth information obtained for said at least one block of said depth component.

15. The method as claimed in claim 9, wherein a value of said parameter used by the depth estimation method is decoded, said value been selected at coding among several candidate values, such that for the selected value, a depth information obtained by said depth estimation method is closest to the depth information obtained for said at least one block of said depth component.

* * * * *